US012525748B2

(12) United States Patent
Yamasaki et al.

(10) Patent No.: US 12,525,748 B2
(45) Date of Patent: Jan. 13, 2026

(54) ELECTRIC CONNECTOR UNIT FOR CONNECTING A SHIELDED CABLE WITH A PLURALITY OF INNER CABLES TO AN ELECTRIC CONNECTOR

(71) Applicant: Tyco Electronics Japan G.K., Kawasaki (JP)

(72) Inventors: Nobuhiro Yamasaki, Kawasaki (JP); Chiyin Li, Kawasaki (JP)

(73) Assignee: TE CONNECTIVITY JAPAN G.K., Kawasaki (JP)

( * ) Notice: Subject to any disclaimer, the term of this patent is extended or adjusted under 35 U.S.C. 154(b) by 482 days.

(21) Appl. No.: 17/979,872

(22) Filed: Nov. 3, 2022

(65) Prior Publication Data

US 2023/0143326 A1 May 11, 2023

(30) Foreign Application Priority Data

Nov. 5, 2021 (JP) ................................ 2021-181287

(51) Int. Cl.

*H01R 13/6582* (2011.01)
*H01R 13/40* (2006.01)
*H01R 13/658* (2011.01)
*H01R 13/6581* (2011.01)
*H01R 13/6591* (2011.01)
*H01R 13/6592* (2011.01)
(Continued)

(52) U.S. Cl.

CPC ......... *H01R 13/6582* (2013.01); *H01R 13/40* (2013.01); *H01R 13/658* (2013.01); *H01R 13/6581* (2013.01); *H01R 13/65912* (2020.08); *H01R 13/6592* (2013.01); *H01R 13/42* (2013.01); *H01R 13/424* (2013.01); *H01R 13/65914* (2020.08); *H01R 13/65917* (2020.08)

(58) Field of Classification Search

CPC .. H01R 13/6582; H01R 13/40; H01R 13/658; H01R 13/6581; H01R 13/65912; H01R 13/6592; H01R 13/42; H01R 13/424; H01R 13/65914; H01R 13/65917

See application file for complete search history.

(56) References Cited

U.S. PATENT DOCUMENTS

2012/0028500 A1* 2/2012 Lee .................... H01R 13/6593 439/607.01
2016/0100509 A1* 4/2016 Yanagihara .......... H05K 9/0098 174/350
2019/0296499 A1* 9/2019 Mori .................. H01R 13/6581

FOREIGN PATENT DOCUMENTS

CN 102388510 A 3/2012
CN 109659772 A * 4/2019 ........... H01R 13/648
WO 2018142956 A1 8/2018

OTHER PUBLICATIONS

Extended European Search Report from the European Patent Office dated Mar. 23, 2023, corresponding to Application No. 22205005.6-1201, 10 pages.

* cited by examiner

*Primary Examiner* — Justin M Kratt

(57) ABSTRACT

An electric connector unit comprises a connector and a cable connected thereto. The connector includes a terminal housing having an opening, and a shell attached to the terminal housing and having a shield fixation portion inserted into the opening. The cable comprises an inner cable bundle having a plurality of inner cables, and a cable shield surrounding the inner cable bundle. At least a portion of the cable shield is inserted into the opening and electrically connected to the shield fixation portion within the opening.

20 Claims, 14 Drawing Sheets

(51) Int. Cl.

| | |
|---|---|
| *H01R 13/42* | (2006.01) |
| *H01R 13/424* | (2006.01) |

ELECTRIC CONNECTOR UNIT FOR CONNECTING A SHIELDED CABLE WITH A PLURALITY OF INNER CABLES TO AN ELECTRIC CONNECTOR

CROSS-REFERENCE TO RELATED APPLICATION

This application claims the benefit of the filing date under 35 U.S.C. § 119(a)-(d) of Japanese Patent Application No. 2021-181287, filed on Nov. 5, 2021.

FIELD OF THE INVENTION

The present disclosure relates to electric connector units. In particular, the present disclosure relates to an electric connector unit including a cable electrically connected thereto.

BACKGROUND

According to the prior art, multipolar L-shaped connectors for connecting a multifiber cable to an electric apparatus exist. Such a connector is provided with an electromagnetic shield structure that electrically shields a cable attached to the connector and a terminal disposed on the connector from each other in order to suppress the radiation of electromagnetic waves to the outside due to a signal delivered to an electric apparatus or the intrusion of electromagnetic waves from the external.

The structures of the electromagnetic shields of these conventional connectors have problems to be overcome. For example, an outer conductor that surrounds the outer peripheral side of an inner cable and a shield element that is disposed in a connector housing internally including a terminal are electrically connected to each other in the connector. In the connection, treatment of the terminal of the cable is performed by removing an end of an insulative coating that covers the outer periphery of the outer conductor, outwardly folding back an end of the outer conductor as a whole, and winding a copper tape around a folded-back portion. The outer conductor and the shield element are electrically connected to each other by pressure-bonding or pressing the shield element to or against such a terminal-treated portion.

In such terminal treatment, the folded-back outer conductor of the cable is directly placed on the insulative coating, and the shield element is pressure-bonded or pressed on the insulative coating on the outer periphery of the cable. However, since an insulative coating is commonly formed of a heat-shrinkable material that is increasingly shrunk with increasing temperature, the outer diameter of the cable can be reduced due to generation of heat and/or the like, caused by the actuation and operation of an electric apparatus. Accordingly, in the above-described connection in which the outer conductor on the insulative coating is pressed, there is a concern that poor contact can occur due to a change in the outer diameter of the cable, caused by the aged deterioration and/or the like of the insulative coating, and the function of the electromagnetic shield is deteriorated.

SUMMARY

An electric connector unit comprises a connector and a cable connected thereto. The connector includes a terminal housing having an opening, and a shell attached to the terminal housing and having a shield fixation portion inserted into the opening. The cable comprises an inner cable bundle having a plurality of inner cables, and a cable shield surrounding the inner cable bundle. At least a portion of the cable shield is inserted into the opening and electrically connected to the shield fixation portion within the opening.

BRIEF DESCRIPTION OF THE DRAWINGS

The features of the present invention will become more apparent by describing in detail exemplary embodiments thereof with reference to the accompanying drawings, in which.

DETAILED DESCRIPTION OF THE EMBODIMENTS

Figure 1:
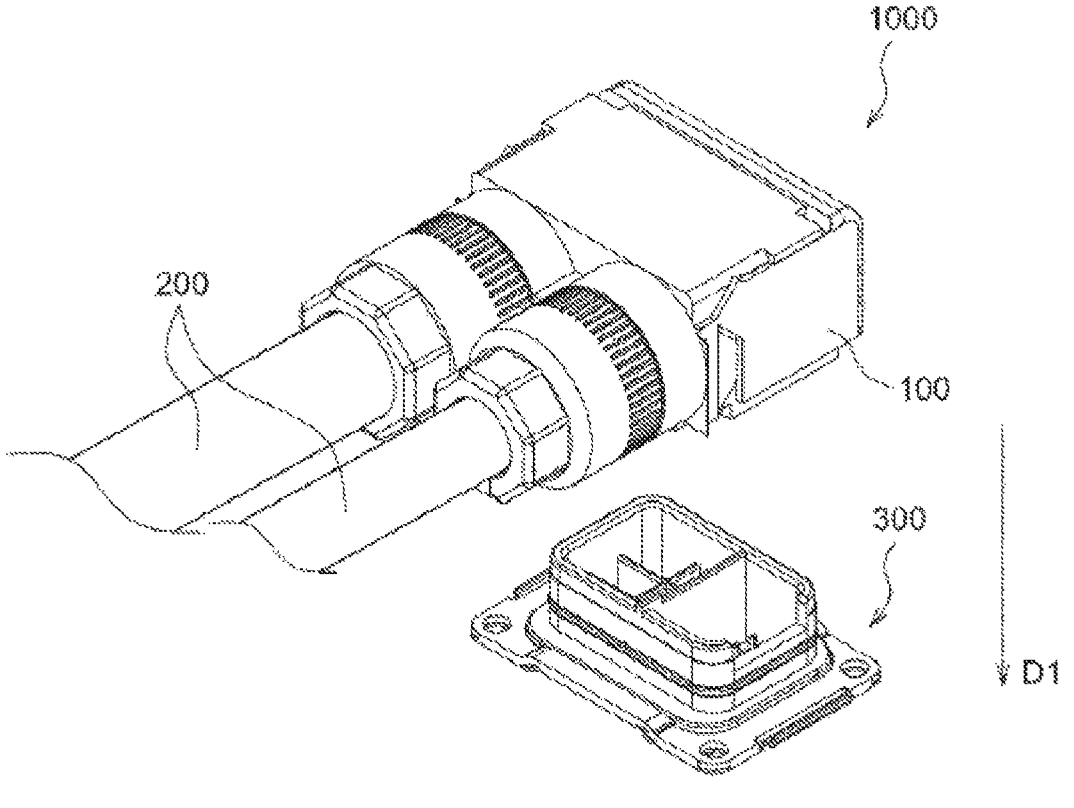
FIG. 1 is an isometric view schematically illustrating an electric connector unit according to one embodiment of the present disclosure.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An electric connector unit according to one embodiment of the present disclosure will be described in more detail below with reference to the drawings. Various elements in the drawings are just described in a schematical and exemplary manner for explaining the present disclosure, and the appearances and dimensional ratios of the elements can be different from those of real things.

Relative terms such as “lower”, “upper”, “horizontal”, “perpendicular”, “above”, “below”, “top”, and “bottom”, derivation terms thereof, “horizontally”, “downward”, “upward”, and the like should be understood to refer to directions as described or illustrated. In such a relative term, which is only for convenience in the explanation, an apparatus need not be configured or operated in a specific direction unless otherwise specified. Moreover, a term such as “attached”, “added”, “connected”, “coupled”, or “interconnected”, or a term similar thereto refers to a relationship in which structures are directly or indirectly fixed or attached to each other with an inclusion, attachment of both the structures which are movable or rigid, or the relationship thereof unless otherwise specified. Further, examples of the features or advantages of the present disclosure are described with reference to preferred aspects. Such aspects are sufficiently described in detail, and enable those skilled in the art to carry out the present disclosure. It should be understood that other aspects can also be used, and processes and electrical or mechanical modifications are enabled without departing from the scope of the present disclosure. Accordingly, the present disclosure is not definitely limited to preferred aspects (aspects combined with single or other features) describing examples of unrestricted combinations of conceivable features.

The term “generally perpendicular” as used herein need not mean “completely perpendicular”, and encompasses aspects of slight deviations therefrom (for example, an angle with respect to a winding axis is in a range of 90°±20°, for example, a range of 90°±10°). The term “generally parallel” as used herein need not mean “completely parallel”, and encompasses aspects of slight deviations therefrom (for example, a deviation from “completely parallel” is in a range of ±20°, for example, in a range of up to ±10°).

A feature of the present disclosure relates to the structure of an electromagnetic shield in an electric connector unit. However, the outline of the electric connector unit is described below with reference to the drawings in order to understand of the whole electric connector unit.

FIG. 1 is an isometric view schematically illustrating an electric connector unit according to one embodiment of the present disclosure. The electric connector unit 1000 includes, as main components, a connector 100 and cables 200 that are connected to the connector 100. The electric connector unit 1000 further includes a device connector 300 that is disposed on a device. The device connector 300 is configured to be placed on the device (not illustrated) and to mutually match with the connector 100.

In the following explanation, the direction of matching between the connector 100 and the device connector 300 is regarded as “upward-downward direction”, and the connector 100 is positioned at a position above the device connector 300 positioned at a lower position in the upward-downward direction.

The term “unit” in the present disclosure corresponds to, for example, a composite article or a matching article including a plurality of components. Accordingly, the electric connector unit 1000 of the present disclosure can correspond to an electric connector composite article or an electric connector matching article including at least the cables 200, the connector 100 that is attached to ends of the cables 200, and the device connector 300 that mutually matches with the connector 100.

Figure 2:
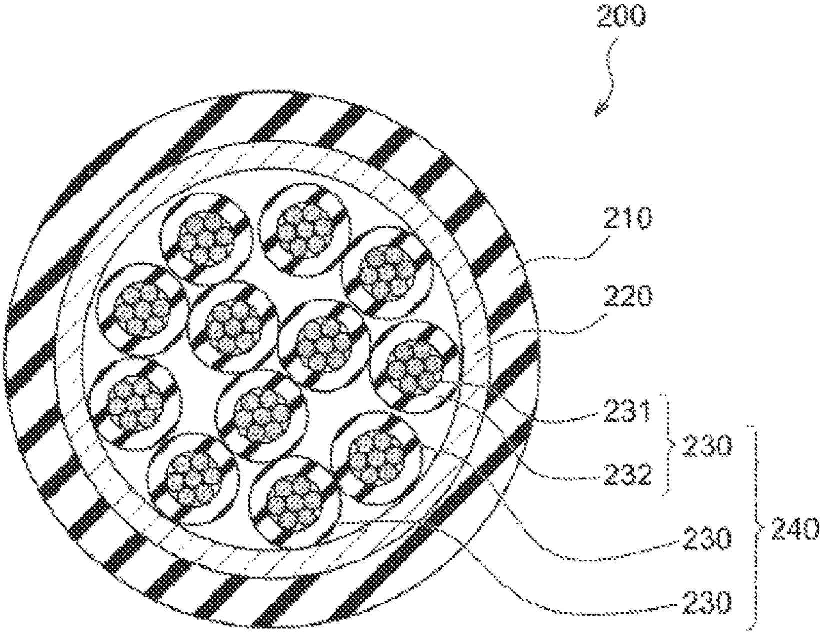
FIG. 2 is a cross sectional view schematically illustrating a cable according to one embodiment of the present disclosure.

FIG. 2 schematically illustrates a cross sectional view of the cable 200 according to one embodiment of the present disclosure. The cable 200 includes: an inner cable bundle 240 including a plurality of inner cables 230, cable shields 220; and an insulative covering element 210 (or a covering material) that surrounds the inner cable bundle 240 and the cable shields 220. As illustrated, each of the plurality of inner cables 230 can be formed by covering the outer periphery of a conductive wire 231 with an insulative inner cable coating film 232. The plurality of inner cables 230 are included in the inner cable bundle 240, and the outer periphery of the inner cable bundle 240 is surrounded by the conductive cable shields 220. The covering element 210 covers the outer peripheries of the cable shields 220 and defines the outer periphery of the cable 200. Such a covering element 210 can also be referred to as “cable jacket”.

The covering element 210 is formed of an insulative material, preferably a flexible insulative material in light of superiority in routing of the cable. For example, the covering element 210 may be formed of, for example, a polymer such as polyvinyl chloride (PVC), polypropylene, fluoropolymer, polyethylene, and/or the like. The conductive wire 231 may be formed of any conductive material, and may be, for example, a pure copper wire, a tinned copper wire, or the like.

Figure 3:
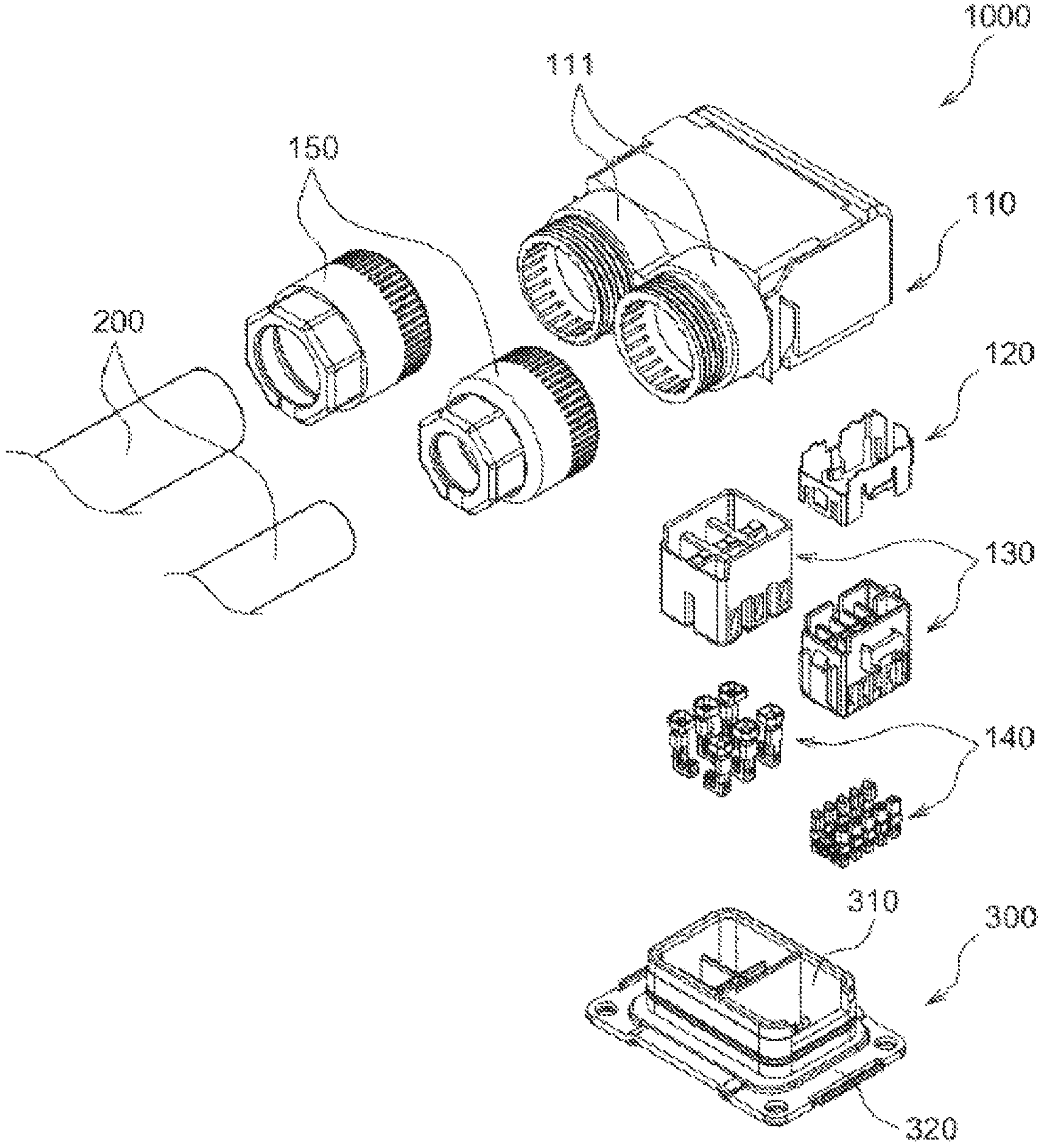
FIG. 3 is an exploded isometric view schematically illustrating an electric connector unit according to one embodiment of the present disclosure.

FIG. 3 is an exploded isometric view schematically illustrating the electric connector unit 1000 according to one embodiment of the present disclosure. The connector 100 includes: terminals 140 that are electrically connected to the inner cables; a terminal housing 130 that houses the terminals 140; a shell 120 that surrounds the outer periphery of the terminal housing 130; and a case housing 110 that houses all thereof. In the connector of the present disclosure, the case housing 110 is a housing that defines the outer side of the connector 100, and the terminal housing 130 is positioned in the case housing 110. Accordingly, the case housing 110 and the terminal housing 130 can also be referred to as "outer housing" and "inner housing", respectively, on the basis of the relative positioning relationship therebetween.

The case housing 110 is an insulative element having a generally box shape, and is opened in a side closer to the device connector 300. Insertion openings 111 through which the cables 200 can be passed may also be formed in at least one side of the case housing 110. In the electric connector unit 1000 of the present disclosure, the cables 200 that match with the connector 100 extend outward from the case housing 110 through the insertion openings 111 (see FIG. 1). The insertion opening 111 may have a cylindrical shape protruding outside the case housing 110. A screw for screwing the insertion openings 111 into screw caps 150 may also be formed on the outer peripheries of the insertion openings 111, and a gap between the insertion openings 111 and the cables 200 may be sealed by tightening the screw caps 150. Although not illustrated, a sealant, a clamp, and/or the like may be used to prevent water from passing through between the screw caps 150 and the insertion openings 111. One end of each of the cables 200 inserted into the case housing 110 is housed in the case housing 110. In the case housing 110, the inner cable bundle (not illustrated) having a predetermined length extends from the ends of the cables 200 toward the direction D1 (see FIG. 1) of mating with the device connector, and a leading end of the inner cable bundle is electrically connected to the terminals 140. More specifically, a connection between the inner cables and the terminals 140 is established by electrically connecting conductive wires that extend from the leading end of the inner cable bundle to the terminals 140. In other words, the cables 200 inserted from the side of the case housing 110 includes the inner cable bundle having the predetermined length that extends from the ends of the cables 200 toward the terminals 140.

The terminals 140 connected to the inner cables may be housed in the terminal housing 130. The terminal housing 130 is configured to match with the device connector 300 described below. Further, the terminal housing 130 is configured to support the terminals 140 connected to the inner cables. In a state in which the device connector 300 matches with the connector 100, each of the terminals 140 in the terminal housing 130 is electrically connected to each of terminals (not illustrated) included in the device connector 300.

In one embodiment of the present disclosure, the device connector 300 is a connector that is disposed in the device, and can also be referred to as "header connector". The device connector of the present disclosure can be applied to various electronic devices, for example, devices such as motors that are used in industrial machines or industrial robots. The device connector 300 includes, as main components, a base 320, an insulative housing 310, and terminals placed in the insulative housing 310. The insulative housing 310 may be disposed on the base 320 placed on a surface of the case (not illustrated) of the device. The connector 100 may be attached to the device connector 300 by, for example, allowing the insulative housing 310 and the terminal housing 130 to match with each other so that the insulative housing 310 surrounds the terminal housing 130. The terminals of the device connector are placed in the interior of the insulative housing, and the terminals are electrically connected to the terminals 140 of the terminal housing 130, respectively, in the state of mating with the connector 100. In other words, the terminals 140 of the leading ends of the inner cables and the terminals housed in the insulative housing 310 are electrically connected to each other by allowing the insulative housing 310 and the terminal housing 130 to match with each other. Moreover, the case housing 110 of the connector is allowed to match to surround the insulative housing 310 in the case of mating with the device connector 300. In one embodiment of the present disclosure, the device connector 300 may include a gasket for preventing water from intruding from the outside. The gasket can be disposed in, for example, the outer periphery of the insulative housing 310 that is made allowed to match with the connector 100, and/or a place in which the base 320 and the device are bonded. As a result, gaps that can be generated in places in which the connector, the device connector, and the device are allowed to match with each other are filled, and electrical elements such as the inner cables and the terminals can be appropriately waterproofed.

Although not illustrated, a locking lever may be used for mating the connector 100 and the device connector 300. In one embodiment of the present disclosure, the locking lever may extend in curved or bent manner over the case housing 110. In a state in which the connector 100 and the device connector 300 mate with each other, the locking lever may be configured to mates with a side of the case housing from the direction opposed to the insertion openings 111 to maintain the mating state.

In the present disclosure, insulative elements such as the case housing 110, the terminal housing 130, and the insulative housing 310 may be formed of an insulative nonconductive material. The insulating elements can include a resin material having an insulation property. Such an insulative element can include at least one thermosetting resin selected from the group consisting of, for example, epoxy resins, phenol resins, silicone resins, and unsaturated polyester resins without particular limitation thereto. Moreover, the elements different from each other may include resin materials different from each other.

A feature of the electric connector unit of the present disclosure is a shield structure for electrically shielding the cables and the terminals connected to the cables from each other. In particular, a feature of the electric connector unit of the present disclosure is the configuration of a shield that is not directly involved in an element that covers the cables. The shield structure in the electric connector unit of the present disclosure is described below.

Figure 4:
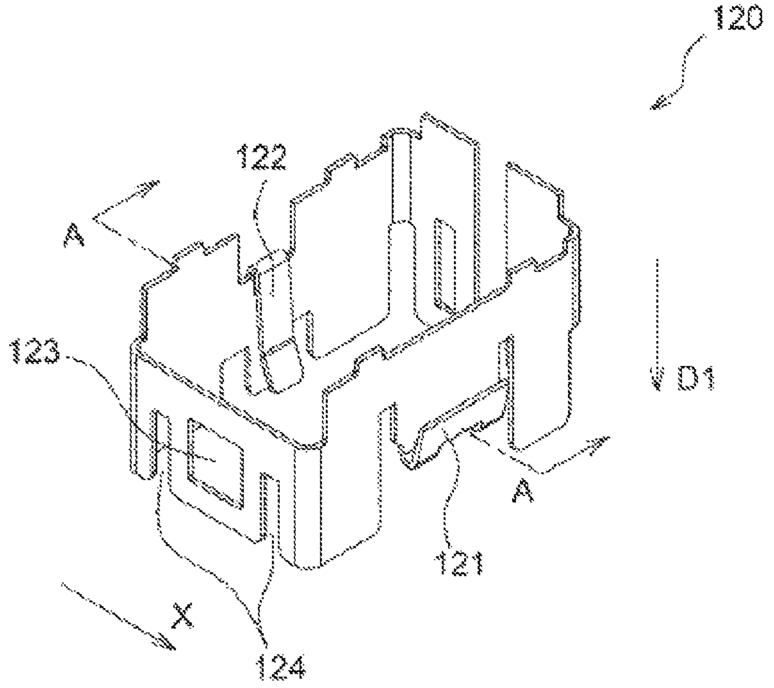
FIG. 4 is an isometric view schematically illustrating the shell of the electric connector unit according to one embodiment of the present disclosure.
Figure 12:
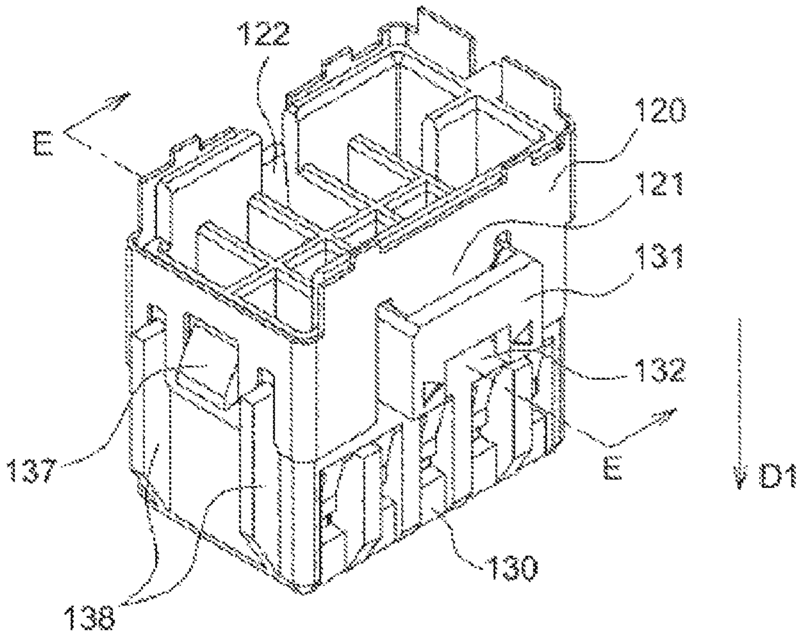
FIG. 12 is an isometric view schematically illustrating a state after the assembly of the terminal housing and shell of the electric connector unit according to one embodiment of the present disclosure.

FIG. 4 is an isometric view schematically illustrating the shell 120 of the electric connector unit according to one embodiment of the present disclosure. FIG. 12 is an isometric view schematically illustrating a state after the assembly of the terminal housing 130 and shell 120 of the electric connector unit according to one embodiment of the present disclosure. In one embodiment of the present disclosure, the shell 120 is attached to the terminal housing 130 that houses the terminals. The shell 120 is placed to function as a shield element for the terminals that are connected to the leading ends of the inner cables (not illustrated). Further, the shell 120 can also be used to secure shield properties for the inner cables and the terminals that are connected to the leading ends thereof. As illustrated in FIG. 12, the shell 120 may be disposed to at least partly surround the entire periphery of the terminal housing 130. In other words, the shell 120 may have a shape bent along a side of the terminal housing 130 and may be positioned to at least partly cover the outer periphery of the terminal housing 130. In other words, the shell 120 of the present disclosure need not be formed to surround the entire periphery of the terminal housing 130. In the electric connector unit of the present disclosure, the shell 120 functions as an electromagnetic shield for an electrical element that is housed in the interior of the terminal housing 130 of the connector, and therefore, can also be referred to as "connector shield".

The shell may be formed of a conductive material with a metal or a soft magnetic material, or a material of which the surface is allowed to have conductivity by plating working or the like. The shell can be formed of a conductive plate-shaped element, and may be formed by, for example, punching working and/or bending working of a sheet metal, without limitation.

Figure 5:
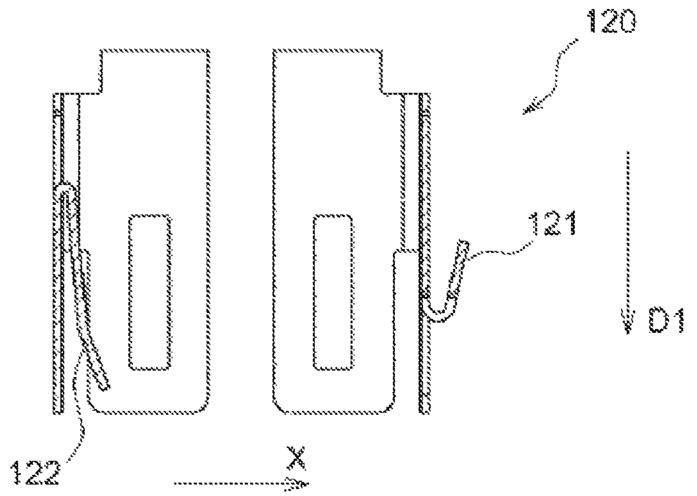
FIG. 5 is a schematic cross-sectional view of a cross section taken along the line A-A of the shell in FIG. 4 and viewed in the arrow direction.

FIG. 5 is a schematic cross-sectional view of a cross section taken along the line A-A of the shell 120 in FIG. 4 and viewed in the arrow direction. In one embodiment of the present disclosure, a shield fixation portion 121 is disposed on a side of the shell 120, as illustrated in FIGS. 4 and 5. The inner cables and the terminals in the terminal housing 130 are electrically shielded from each other by electrically connecting the shield fixation portion 121 to at least some of the cable shields 220 (see FIG. 2) an opening 131 (see FIG. 12), described below, in the terminal housing 130. The shape of the shield fixation portion 121 is not particularly limited as long as insertion into the opening 131 of the terminal housing 130 is enabled, and an electrical connection to the cable shields that are inserted into the opening 131 is achieved. For example, the shield fixation portion 121 may have a shape that extends from a side of the shell 120 and is bent to be folded back, as illustrated in FIG. 5.

The term "bending" in the present disclosure also encompasses curving or flexure. Such a bending shape can also be referred to as, for example, "folding-back shape", "generally U-shape", "generally V-shape", "generally J-shape", "curve shape having local maximum point", or the like, as viewed in a cross-section illustrated in FIG. 5. The shield fixation portion 121 is conductive, and may be formed by, for example, bending a sheet metal included in the shell 120. In other words, the shell and the shield fixation portion may be formed of a single conductive sheet material in one embodiment of the present disclosure. This means that the shell and the shield fixation portion may form an integrated article in which the shell and the shield fixation portion are integrated with each other.

Figure 6:
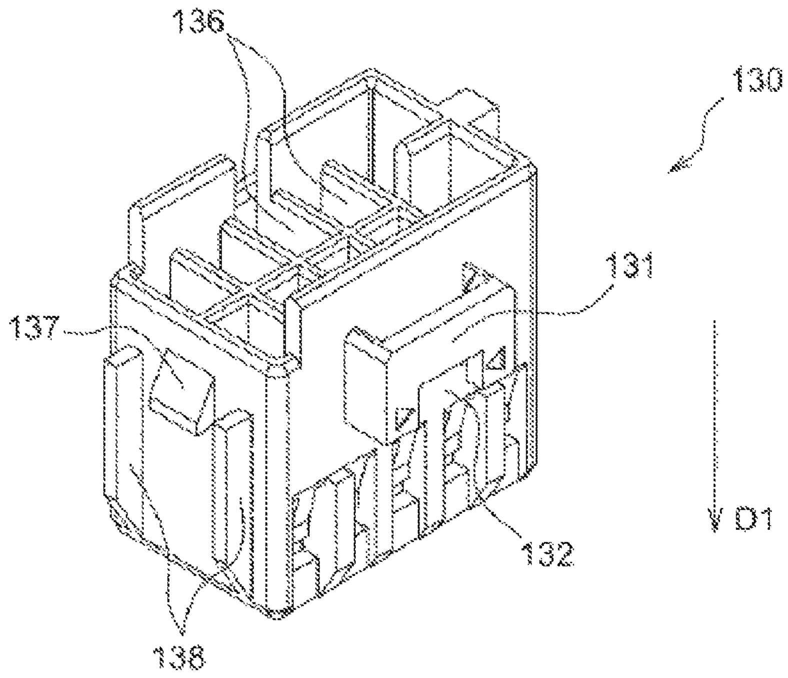
FIG. 6 is an isometric view schematically illustrating the terminal housing of the electric connector unit according to one embodiment of the present disclosure.
Figure 7:
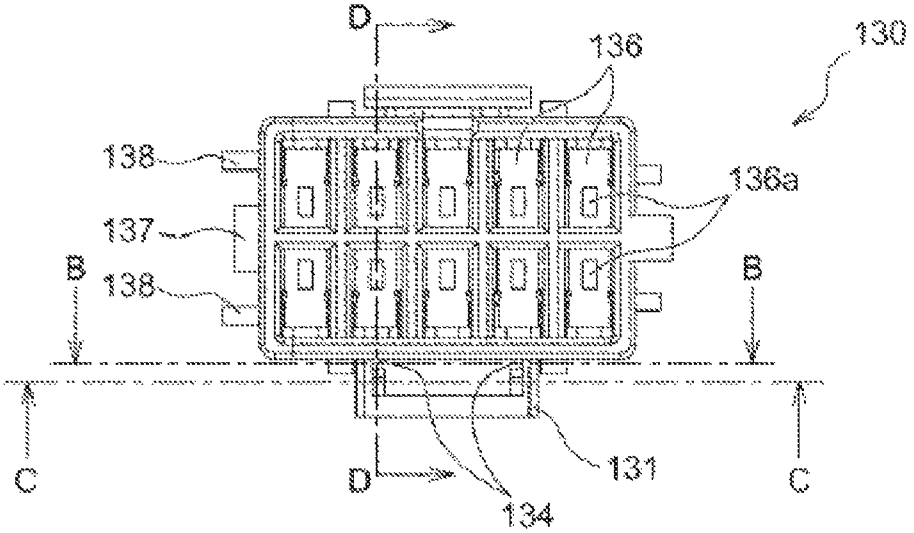
FIG. 7 is a top view schematically illustrating the terminal housing of the electric connector unit according to one embodiment of the present disclosure.

FIG. 6 is an isometric view schematically illustrating the terminal housing 130 of the electric connector unit according to one embodiment of the present disclosure. FIG. 7 is a top view schematically illustrating the terminal housing 130. As illustrated, the terminal housing 130 may include terminal housing portions 136 that individually house the terminals that are connected to the inner cables. The terminal housing portions 136 may be opened in a direction in which the inner cables connected to the terminals extend. Through-holes 136*a* through which the terminals (for example, contact pins) of the device connector can pass may be opened in the bottoms of the terminal housing portions 136. In a state in which the connector and the device connector mate with each other, the terminals of the device connector, inserted into the through-holes 136*a*, are electrically connected to the terminals connected to the inner cables in the interiors of the terminal housing portions 136. In other words, each of the terminals, electrically connected to each of the terminals of the device connector, may be supported by being inserted into each of the terminal housing portions 136.

In one embodiment of the present disclosure, each of the terminals that are housed in the terminal housing 130 includes an earth terminal 140*a* that is connected to a ground potential and a signal terminal 140*b* for transmitting a signal. For example, one earth terminal 140*a* and a plurality of signal terminals 140*b* may be housed in each of the plurality of terminal housing portions 136 of the terminal housing. In a state in which the connector and the device connector mate with each other, the earth terminal and signal terminal of the terminal housing are electrically connected to the earth terminal and signal terminal placed in the insulative housing of the device connector, respectively. In other words, the earth terminal of the connector may be configured to be electrically connected to the earth terminal of the device connector, and the signal terminal of the connector may be configured to be electrically connected to the signal terminal of the device connector.

Moreover, the terminal housing of the present disclosure includes the opening 131, as illustrated in FIGS. 6 and 7. The opening 131 may be located in a side of the terminal housing 130. In one embodiment of the present disclosure, the opening 131 can be opened in the same direction as the direction of the terminal housing portions 136. The opening 131 may have a shape passing through along the direction D1 of mating with the device connector. In other words, the opening 131 according to one embodiment of the present disclosure can have a shape passing through along the upward-downward direction illustrated in FIG. 6. The shape of the opening 131 may be, for example, a generally rectangular shape, as viewed in a top face illustrated in FIG. 7. More specifically, the opening 131 may include a space with a generally rectangular shape, extending in a great length, along a side of the terminal housing 130, as viewed in the top face. The entire periphery of the opening 131 need not be surrounded. In other words, in one embodiment of the present disclosure, the opening 131 may have a discontinuous shape in which the entire periphery is unclosed, as viewed in the top face.

The terminal housing including the opening may be formed of a resin material having an insulation property. In other words, the terminal housing and the opening may be integrally formed by injection-molding an insulative resin material. This means that the terminal housing and the opening may be an integrated article in which the terminal housing and the opening are integrated with each other. The insulative resin material can include at least one thermosetting resin selected from the group consisting of, for example, epoxy resins, phenol resins, silicone resins, and unsaturated polyester resins, without particular limitation thereto.

Figure 11:
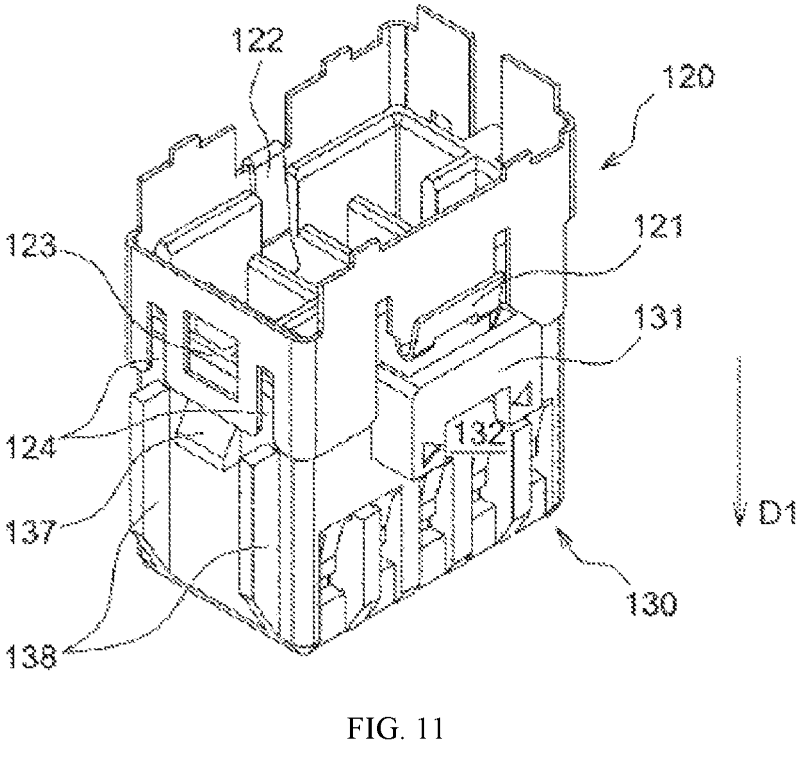
FIG. 11 is an isometric view schematically illustrating a state before assembly of the terminal housing and shell of the electric connector unit according to one embodiment of the present disclosure.
Figure 13:
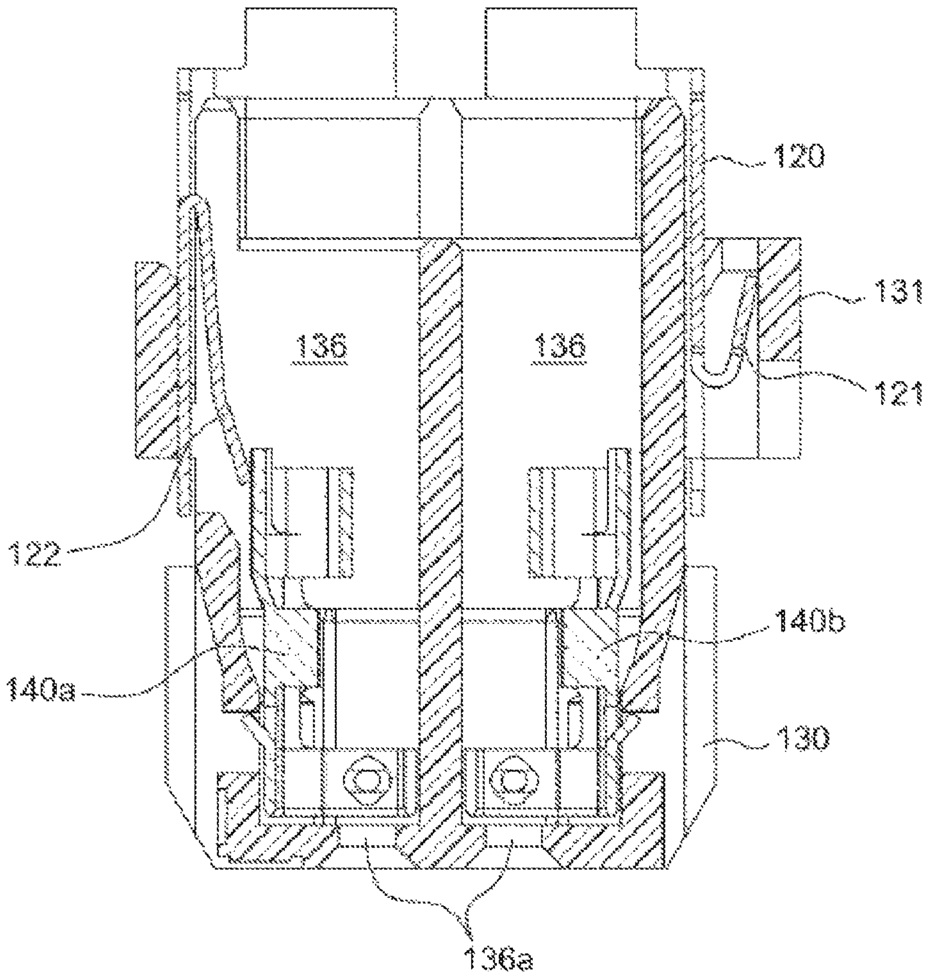
FIG. 13 is a schematic cross-sectional view of a cross section taken along the line E-E of the assembled terminal housing and shell illustrated in FIG. 12, and viewed in the arrow direction.

FIG. 11 is an isometric view schematically illustrating a state before assembly of the terminal housing 130 and shell 120 of the electric connector unit according to one embodiment of the present disclosure. FIG. 12 is an isometric view schematically illustrating a state after the assembly of the terminal housing 130 and the shell 120 illustrated in FIG. 11. As described above, the shell 120 can be attached to the terminal housing 130 in which the terminals 140 (140*a*, 140*b*) that are connected to the leading ends of the inner cables (not illustrated) are housed. More specifically, the shell 120 can be positioned along a side of the terminal housing 130 to surround the terminals positioned in the terminal housing 130 and the inner cables connected to the terminals. As illustrated in FIGS. 11 and 12, the shell 120 and the terminal housing 130 are allowed to match with each other so that the shield fixation portion 121 is inserted into the opening 131 of the terminal housing 130. In other words, the shield fixation portion 121 may be located in the opening 131 in a state in which the shell 120 and the terminal housing 130 are assembled with each other. The shield fixation portion 121 may have a shape bent in the opening 131 in the state after the assembly. FIG. 13 is a schematic cross-sectional view of a cross section taken along the line E-E of the assembled terminal housing 130 and shell 120 illustrated in FIG. 12, and viewed in the arrow direction. As illustrated, the shell 120 and the terminal housing 130 may be allowed to match with each other so that the shield fixation portion 121 having the shape bent to be folded back is housed in the opening 131.

As illustrated in FIGS. 11 and 12, the terminal housing 130 may have at least one latch 137 for fixing the shell 120. The latch 137 may protrude outward in a side of the terminal housing 130. Moreover, the shell 120 may include a latch receiving portion 123 that engages with the latch 137. Such a structure allows the shell 120 allowed to match with the terminal housing 130 to be caught, and enables the shell 120 to be more preferably prevented from being unintentionally detached. Further, the terminal housing 130 may include at least one guide 138 that rises toward the outside of the terminal housing 130 in a side and extends along the mating direction D1. Moreover, the shell 120 may include a portion to be guided 124 that guides the shell 120 to a position at which the assembly is completion, in correspondence with such a guide 138. The incorrect mounting of the shell and the backlash of the shell and the terminal housing can be more preferably prevented by allowing the terminal housing 130 and the shell 120 to match with each other so that the portion to be guided 124 is along the guide 138.

Figure 14:
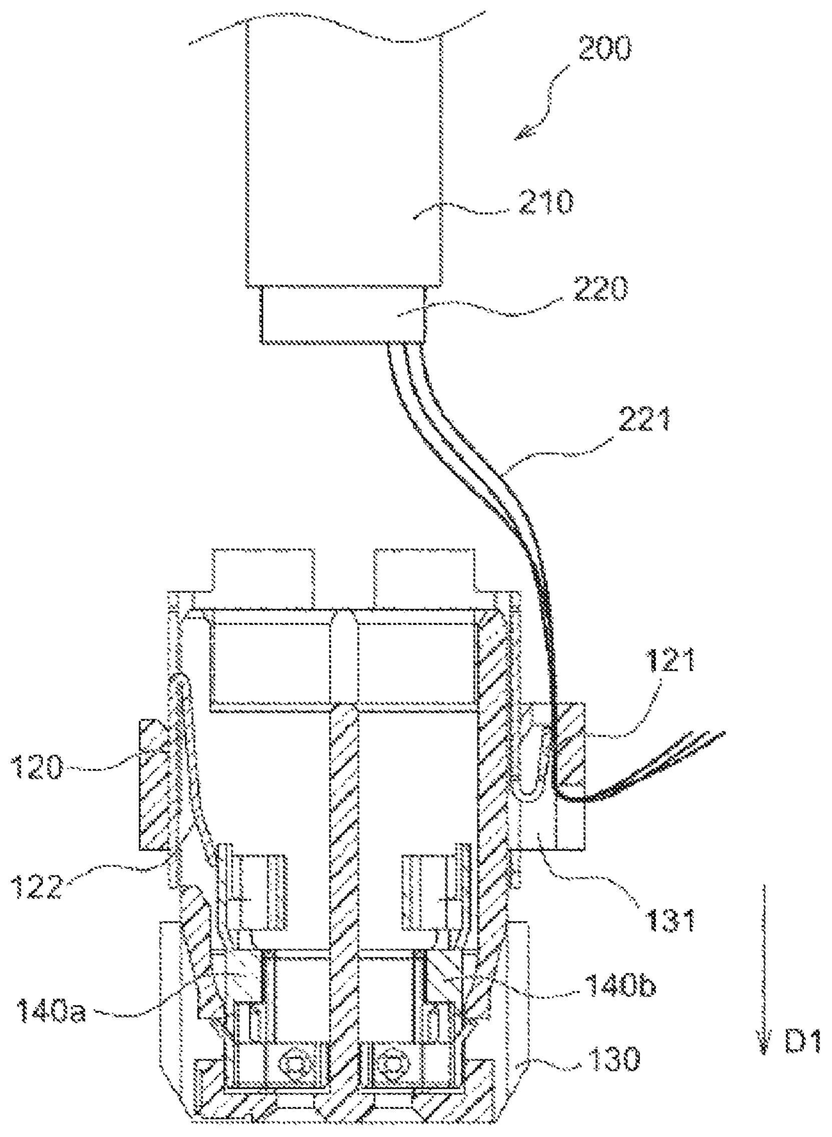
FIG. 14 is a schematic cross-sectional view for explaining a connection between the cable shields and the shell in the terminal housing and shell illustrated in FIG. 13.

FIG. 14 is a cross sectional view schematically illustrating a state in which the shell 120 and the cable shields 220 are connected to each other in the electric connector unit of the present disclosure. As illustrated, in one embodiment of the present disclosure, at least some of cable shields (for example, conductive elements 221 described below) extends toward the opening 131 of the terminal housing 130, and is inserted into the opening 131. In other words, at least some of the cable shields 220 may be exposed from one end of each of the cables 200 outside the insulating covering element 210, and inserted into the opening 131. In other words, at least some of the cable shields may extend through the opening 131 of the terminal housing 130. The cable shields inserted into the opening 131 are electrically connected to the shield fixation portion 121 of the shell 120 matching with the terminal housing 130. In other words, at least some of the cable shields may be electrically connected to the shield fixation portion 121 in the interior of the opening 131. More specifically, at least some of the cable shields may be inserted between the shield fixation portion 121 and the inner wall surface of the opening 131, and may be electrically connected to the shield fixation portion 121. This means that a gap into which at least some of the cable shields can be inserted can exist between the shield fixation portion 121 and the inner wall of the opening 131. In other words, the opening 131 may include a space for inserting at least a part of the shield fixation portion 121 and the cable shields, and electrically connecting the shield fixation portion 121 and the cable shields to each other. The above-described configuration enables the electrical connection between the cable shields 220 and the shell 120 to be performed in the opening 131 of the terminal housing 130. This means that the cable shields 220 and the shell 120 are electrically connected to each other without placing the cable shields 220 and the shell 120 on the outer surface of the covering element 210. In other words, the above-described configuration enables the cable shields 220 and the shell 120 to be connected to each other without being directly involved in the covering element 210 and outer diameters of the cables. Therefore, poor connection caused by the aged deterioration of the covering element and by a change in the outer diameter dimensions of the cables can be more preferably prevented from occurring. Further, the above-described structure enables the cable shields 220 and the shell 120 to be electrically connected without interposing another element such as copper foil or a crimp terminal between the cable shields 220 and the shell 120. Accordingly, the configuration of the more suitable electromagnetic shield that does not require a further connecting element in connection between shield elements in the cables and the connector can be achieved in the electric connector unit of the present disclosure.

In the electric connector unit of the present disclosure, the cable shields 220 includes a conductive element to electrically shield the inner cable bundle. In one embodiment of the present disclosure, at least some of the conductive elements 221 included in the cable shields 220 are sandwiched between the opening 131 of the terminal housing and the shield fixation portion 121 of the shell, as illustrated in FIG. 14. The shield fixation portion 121 and at least some of the conductive elements 221 included in the cable shields 220 are electrically connected to each other in the interior of the opening 131, to enable an electrical connection between the shell 120 and the cable shields 220 to be achieved. In other words, the cable shields 220 and the shield fixation portion 121 may be electrically connected by sandwiching at least some of the conductive elements 221 included in the cable shields 220 between the opening 131 and the shield fixation portion 121 inserted into opening 131. At least some of the conductive elements 221 included in the cable shields 220 may extend toward the opening 131 to form a crosslink between the cable shields 220 and the shield fixation portion 121. In other words, the conductive elements 221 extend more outward than the cables 200 from an end of the cable shields 220, and are electrically connected to the shield fixation portion 121 in the opening 131 of the terminal housing. The conductive element that extends is not limited to a single wire, and may include a bundle, a stranded wire, a braided wire, a twisted wire, or the like including a plurality of conductive elements. The above-described configuration enables achievement of the more suitable electromagnetic shield that is not directly involved in the covering element 210 and outer diameters of the cables. Further, the cable shields 220 and the shell 120 are electrically connected to each other by direct contact between the conductive elements 221 drawn from the cable shields and the shield fixation portion 121 of the shell. In other words, the cables used in the present disclosure can be regarded as no-drain-element-placed type cables in which a drain element different from the cable shields is not disposed. In view of the above, the configuration of the more suitable electromagnetic shield that does not necessarily require a further element in the connection between the cable shields and the shell can be achieved in the electric connector unit of the present disclosure.

The conductive elements 221 used in the cable shields 220 are preferably a conductive material having flexibility in view of superiority in wiring to an instrument or the like positioned in a narrow space. In particular, the conductive elements 221 are more preferably an annealed copper wire, a silver wire, a nickel wire, an alloyed wire, or a conductive wire such as a metal compound in light of superiority in durability and flexibly. A conductive plated layer such as tin plating, nickel plating, or silver plating may be formed on an element surface to prevent occurrence of oxidation or rusting. The conductive wire is a thin wire having conductivity, and therefore, can also be referred to as, for example, a conductive fiber, a conductive filament, or a conductive wire, or the like. The cable shields 220 may be formed by braiding or spiral covering (or serving) of a plurality of conductive elements. For example, the cable shields 220 may be a braid formed by weaving a plurality of conductive elements. Alternatively, the cable shields 220 may be formed by helically winding the conductive elements 221 along the longitudinal direction of the cables. Alternatively, the cable shields 220 may also be formed by braiding or spiral covering of stranded wires formed by twisting a plurality of conductive elements.

For example, when the cable shields 220 include the conductive elements 221 formed by braiding or spiral covering, a stranded wire formed by disentangling the conductive elements 221 included in the cable shields 220 and twisting a part taken from the disentangled conductive elements 221 may be inserted into the opening 131. Alternatively, the conductive elements 221 that are inserted into the opening 131 may be a non-stranded wire including at least some of the conductive elements 221 included in the cable shields 220. Alternatively, the cable shields 220 may be configured so that some of the conductive elements 221 extend, and some of such conductive elements 221 may be drawn from ends of the cables 200 and inserted into the opening 131. As described above, use of a braid as the cable shields can enable at least some of the cable shields to be more easily inserted into the opening.

Connection to Shell and Cable Shields (Application Example)

Alternatively, the conductive element included in the constitutes cable shields 220 may have, for example, a linear, long, sheet, or tape shape. The conductive element may have, for example, a linear or curved shape in planar view, and the thickness of the conductive element need not be uniform. For example, the cable shields 220 may be formed of metal foil, laminated metal, metal laminate polyimide, a conductive polymer layer, a conductive, continuous (for example, sheet-shaped) material, and/or and the like. The conductive element need not be coated with an insulative material (for example, a resin element such as polyvinyl chloride or polyethylene).

In one embodiment, a different shield element that is electrically connected to the cable shields 220 may be inserted into the opening. In other words, the shield fixation portion and the shield element may abut on each other in the opening, and the cable shields and the shield fixation portion may be electrically connected to each other through the shield element. Such a shield element is not particular limited as long as the shield element can be inserted between the shield fixation portion and the opening in the opening, and may be, for example, a shield element with a long and narrow shape, which extends from ends of the cable shields into the opening. Accordingly, the shield element may be, for example, a conductive long element, a long sheet-shaped element, or a strip linear element. The shield element may have, for example, a linear or curved shape in planar view, and the thickness of the shield element need not be uniform. Further, the shield element is not limited to a single wire, and may include a bundle, a stranded wire, a braided wire, a twisted wire, or the like including a plurality of conductive components. The shield element need not be coated with an insulative material (for example, a resin element such as polyvinyl chloride or polyethylene).

As illustrated in FIGS. 6 and 7, the opening 131 of the terminal housing, into which the shield fixation portion and at least some (for example, conductive elements) of the cable shields are inserted may be positioned in an outer side of the terminal housing 130. In other words, the opening 131 may be formed to protrude outward in a side of the terminal housing 130. For example, the opening 131 may be disposed to form a space outside the terminal housing 130 by the outer side of the terminal housing 130 and a side wall having a generally C-shape as viewed in a top face illustrated in FIG. 7. In such a structure, the shield fixation portion 121 of the shell 120 is inserted into the opening 131 along the outer side of the terminal housing 130. In other words, the shield fixation portion 121 that is inserted into the opening 131 may have a shape that extends toward the direction D1 of mating with the connector and the device connector along the outer side of the terminal housing 130 and is bent to be folded back in the opening 131, as illustrated in FIG. 14. More specifically, the shield fixation portion 121 may extend along the outer side of the terminal housing 130 and may be then bent to be folded back toward the inner wall surface facing the side. In such a structure, the cable shields (for example, the conductive elements 221) that are inserted into the opening 131 may be inserted along the inner wall surface facing the outer side of the terminal housing 130 to be electrically connected to the folded-back shield fixation portion 121. In such a structure, the outer side of the terminal housing 130 including the opening 131 can be more widely covered with a conductive element included in the shield fixation portion 121. Accordingly, the inner cables and terminals positioned in the terminal housing can be more preferably electrically shielded. Further, the cable shields and the shield fixation portion are positioned outside the terminal housing, whereby an electrical element positioned in the interior of the terminal housing and a shield element are isolated from each other by the side wall of the terminal housing, and therefore, incorrect contact between the elements can be more preferably prevented.

In one embodiment of the present invention, the shield fixation portion 121 may be a plate spring. More specifically, the shield fixation portion 121 may be a plate spring supported in a cantilever manner on a side of the shell 120, as illustrated in FIGS. 4 and 5. Such a plate spring has a force (for example, elastic force or elastic biasing force) exerted in the direction of being distanced from the shell 120 (that is, the direction X in FIG. 5). Such a direction X may be, for example, a direction that is generally perpendicular to the mating direction D1, as illustrated in FIG. 5. The elastic force of the shield fixation portion 121 which is a plate spring is exerted on the inserted cable shields in a state in which the cable shields (for example, the conductive elements 221) and the shield fixation portion 121 are inserted into the opening 131, as illustrated in FIG. 14. In other words, the cable shields 220 inserted into the opening 131 of the terminal housing 130 can be fixed due to the elastic force of the shield fixation portion 121 which is the plate spring. In other words, the shield fixation portion 121 may be configured to interfere with the inner wall surface of the opening 131 and the cable shields inserted into the opening 131, to be elastically deformed, and to come into intimate contact with the cable shields in the interior of the opening 131 when the shield fixation portion 121 is inserted into the opening 131. This means that the shield fixation portion 121 presses the cable shields against the inner wall surface of the opening 131, whereby the cable shields can be more preferably sandwiched in the opening 131. In other words, the shield fixation portion 121 which is the plate spring elastically comes into contact with the cable shields inserted into the opening 131, whereby more reliable and stable electric connection can be provided. In one embodiment of the present disclosure, the cable shields (for example, the conductive elements 221) inserted into the opening 131 may be passed through the opening 131 and then folded back, as illustrated in FIG. 14. More specifically, at least some of the cable shields may pass through the opening 131, and ends of the cable shields passing through the opening 131 may be bent to be folded back along the outer wall surface of the opening 131. In other words, as illustrated in FIG. 14, the cable shields inserted into the opening 131 toward the mating direction D1 may pass through the opening 131 and then bent, and the ends of the cable shields may extend toward a direction (upward direction in the figure) generally substantially opposed to the direction D1. Such folding-back can contribute to prevention of the cable shields from unintentionally falling out of the opening 131, and of inhibition of the electrical connection of the cable shields to the shield fixation portion 121.

In one embodiment of the present disclosure, the opening 131 may include a notched portion 132, and the cable shields (for example, the conductive elements 221 illustrated in FIG. 14) inserted into the opening 131 may be folded back in the notched portion 132. In other words, the opening 131 may include the notched portion 132 in a place in which the inserted cable shields 220 extend. In other words, the opening 131 may have a shape in which a part of a side wall facing a side of the terminal housing 130 is notched. For example, in the terminal housing 130 illustrated in FIG. 6, the cable shields may be inserted from the upper opening of the opening 131 toward a downward direction, and may be folded back in an upward direction at the notched portion 132 formed in the center of the lower end of the side wall of the opening 131. Such a structure allows the cable shields inserted into the opening 131 to be collected in the notched portion 132 and a portion extending from the opening 131 to be folded back. The cable shields are collected on the inner wall surface of the side wall including the notched portion 132 in the opening 131 by using the notched portion 132, and therefore, the cable shields can be more reliably sandwiched between the shield fixation portion and the inner wall surface. Accordingly, the structure in which the cable shields are folded back at the notched portion 132 can contribute to more reliable and stable electrical connection between the shield fixation portion and the cable shields. Further, the cable shields are collected in the side including the notched portion 132 when the cable shields are folded back, so that the notched portion 132 can also help the insertion of the shield fixation portion into the opening to be further facilitated in the operation of connection between the cable shields and the shell described below.

In one embodiment of the present disclosure, the shell 120 further includes the tongue 122 that is electrically connected to the earth terminal 140*a*, as illustrated in FIG. 13. In one embodiment of the present disclosure, the tongue 122 of the shell 120 is electrically connected to the earth terminal 140*a* in the terminal housing 130 when the shell 120 matches with the terminal housing 130. In other words, the tongue 122 may be formed to come into contact with the earth terminal 140*a* positioned in the terminal housing portion 136, and to be electrically connected to the earth terminal 140*a*, in a state in which the shell 120 and the terminal housing 130 match with each other. As already described, the earth terminal 140*a* in the terminal housing 130 is configured to be electrically connected to the ground terminal of the device connector in the mating state of the electric connector unit. Therefore, the shell 120 is grounded by electrically connecting the tongue 122 and the earth terminal 140*a* in the terminal housing 130 to each other. In other words, the shell 120 and the earth terminal 140*a* are electrically connected to each other by operation of allowing the shell 120 and the terminal housing 130 to match with each other. Further, the shell 120 and the earth terminal of the device connector can be electrically connected to secure the shielding properties of the terminals in the connector by allowing the connector and the device connector to mate with each other. This means that the cable shields, the shell, and the ground terminal of the device connector are electrically connected to electrically shield electrical elements (for example, the conductive wire of the inner cable, and the signal terminal 140*b*) in the electric connector unit. The above-described structure enables the electromagnetic shield of the electric connector unit to be more easily configured by the operation of allowing the shell 120 and the terminal housing 130 to match with each other and the operation of allowing the connector and the device connector to mate with each other. In other words, the electric connector unit of the present disclosure can enable the electromagnetic shield to be more easily formed without requiring any additional laborious operation (for example, treatment of a cable terminal with a copper tape or the like, pressure bonding, welding, or the like) for a connection between shield elements consisting of the cable shields, the shell, and the earth terminal.

The tongue 122, which is a conductive element, may be formed by, for example, bending/working of the shell 120 and a single sheet metal. In other words, the shell and the tongue may be an integrated article in which the shell and the tongue are integrated with each other. In one embodiment of the present disclosure, the tongue 122 may have a long shape extending to be folded back from a side of the shell 120 toward the interior of the terminal housing portion 136, as illustrated in FIGS. 4 and 13. The tongue 122 may be formed to extend from the opening of the terminal housing portion 136 toward the earth terminal 140*a* placed in the terminal housing portion 136 and to be electrically connected to such an earth terminal 140*a*. In other words, the tongue 122 may extend toward the interior of at least one of the plurality of terminal housing portions 136, and the earth terminal 140*a* may be placed in the terminal housing portion 136 in which the tongue 122 extends. The tongue 122 may have an elastic biasing force by being supported on a side of the shell 120 in a cantilever manner. In other words, the tongue 122 may have the structure of a cantilever plate spring. The tongue 122 is allowed to be a cantilever-like plate spring, whereby the tongue 122 and the earth terminal 140*a* placed in the terminal housing portion 136 can come into elastic contact with each other to achieve a more reliable and stable electric connection therebetween.

Subsequently, the connection between the cable shields and the shell in the electric connector unit of the present disclosure will be described point by point below. FIGS. 15A to 15D are schematic views illustrating a procedure of a connection between the cable shields and the shell in the electric connector unit according to one embodiment of the present disclosure.

Figure 15A:
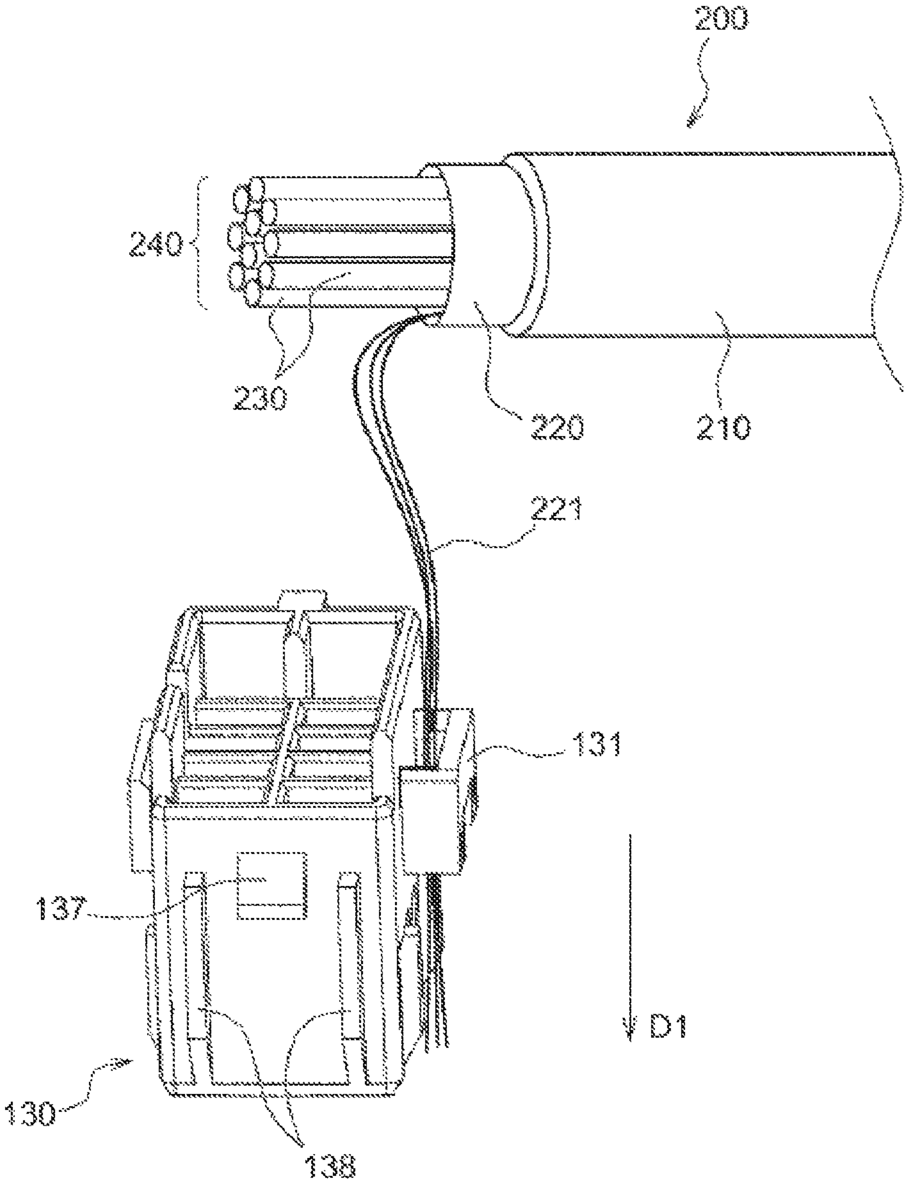
FIG. 15A is a schematic view for explaining a connection between the cable shields and the shell in the electric connector unit according to one embodiment of the present disclosure.

First, at least some of the cable shields 220 are inserted into the opening of the terminal housing 130 in the connection between the shell 120 and the cable shields 220 (see FIG. 15A). For example, when the cable shields 220 include a conductive element, the conductive elements 221 in a plural form drawn from the cable shields 220 may be inserted into the opening 131 of the terminal housing 130. The inserted cable shields may pass through the opening 131 and extend toward the direction of mating with the device connector.

Figure 15B:
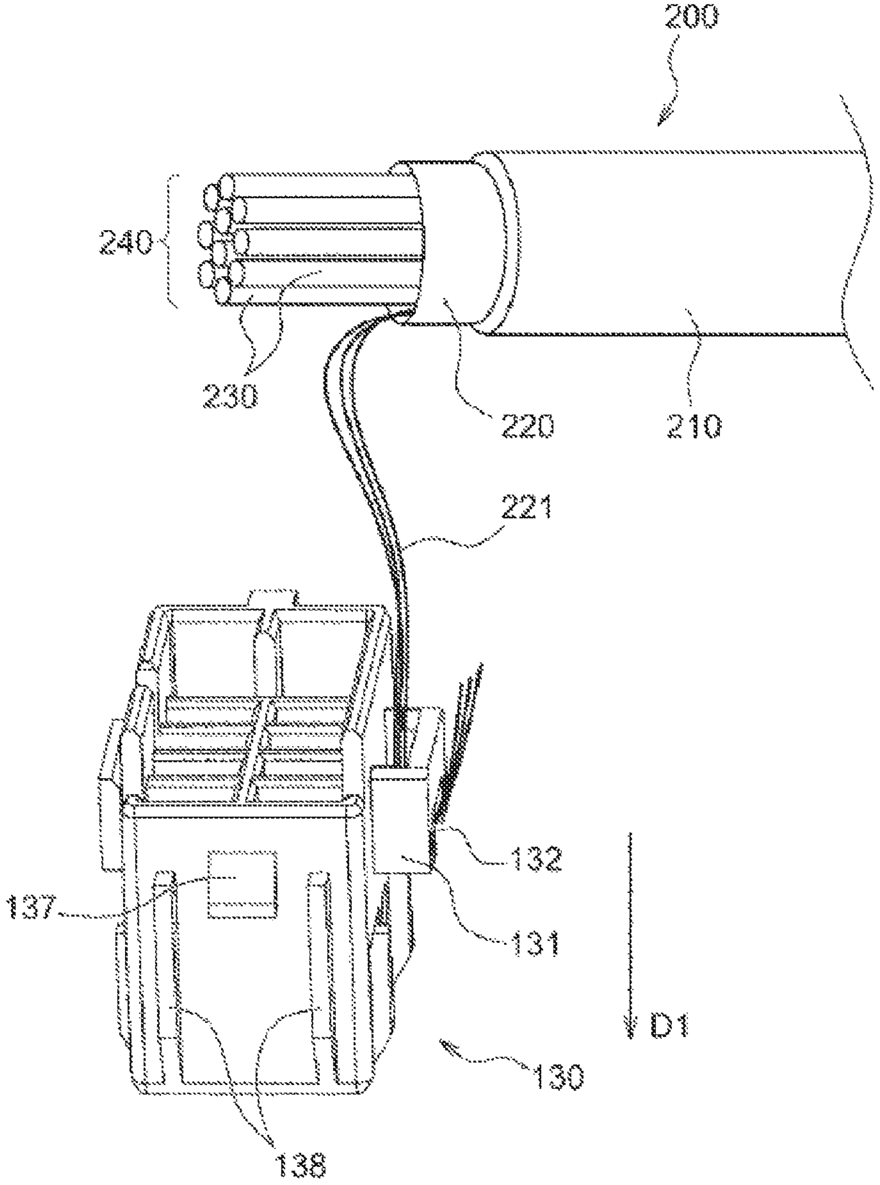
FIG. 15B is a schematic view for explaining a connection between the cable shields and the shell in the electric connector unit according to one embodiment of the present disclosure.

Subsequently, the ends of the cable shields that have passed through the opening 131 may be folded back toward a direction that is generally opposed to the insertion direction, as illustrated in FIG. 15B. In other words, the ends of some of the cable shields (for example, the conductive elements 221) may be passed through the opening 131 and bent to be folded back along the outer wall surface of the opening 131. The cable shields 220 may be folded back at the notched portion 132 formed in the opening 131. In other words, the cable shields inserted into the opening 131 may be collected and bent to be folded back at the notched portion 132. Such folding back can contribute to prevention of the inserted cable shields from falling out. The cable shields are collected and then folded back at the notched portion 132, whereby the subsequent insertion of the shield fixation portion 121 can be further facilitated.

Figure 15C:
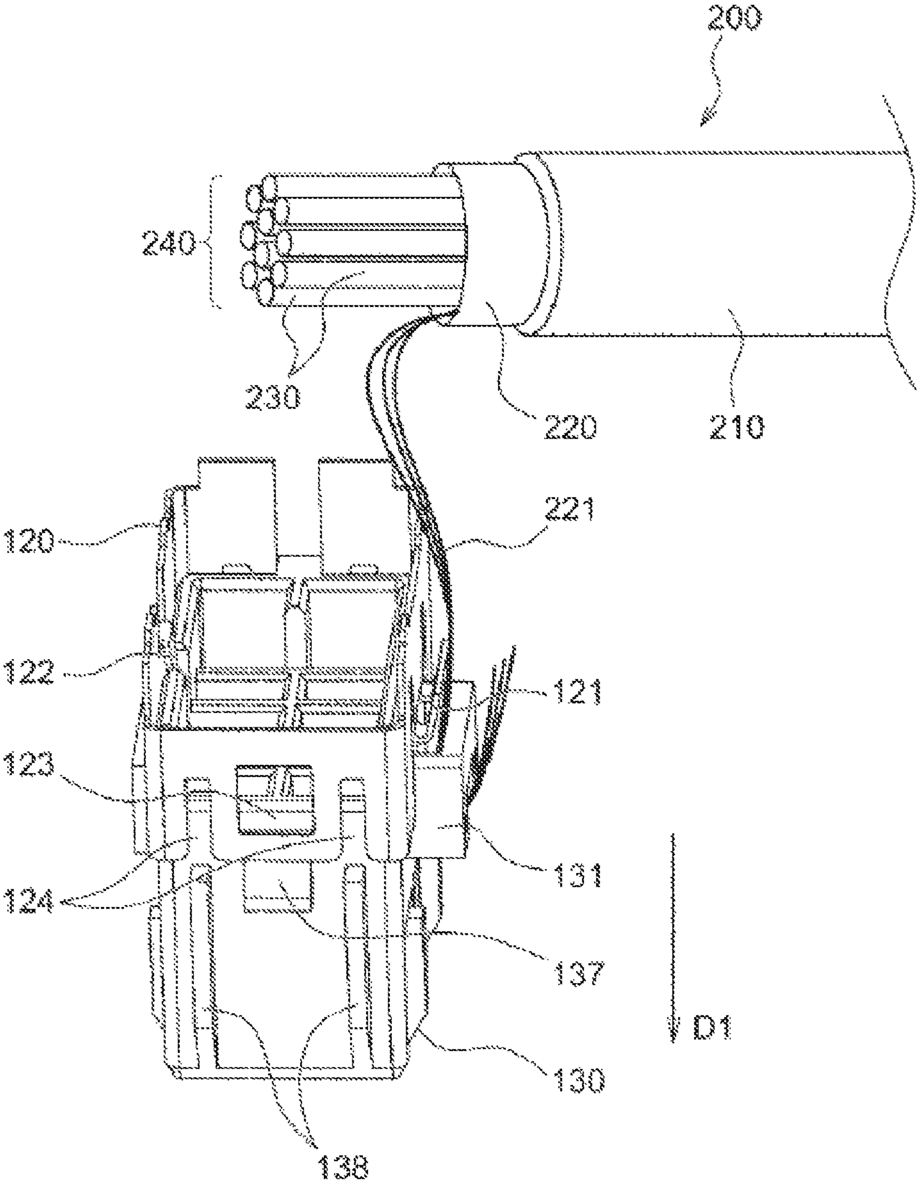
FIG. 15C is a schematic view for explaining a connection between the cable shields and the shell in the electric connector unit according to one embodiment of the present disclosure.
Figure 15D:
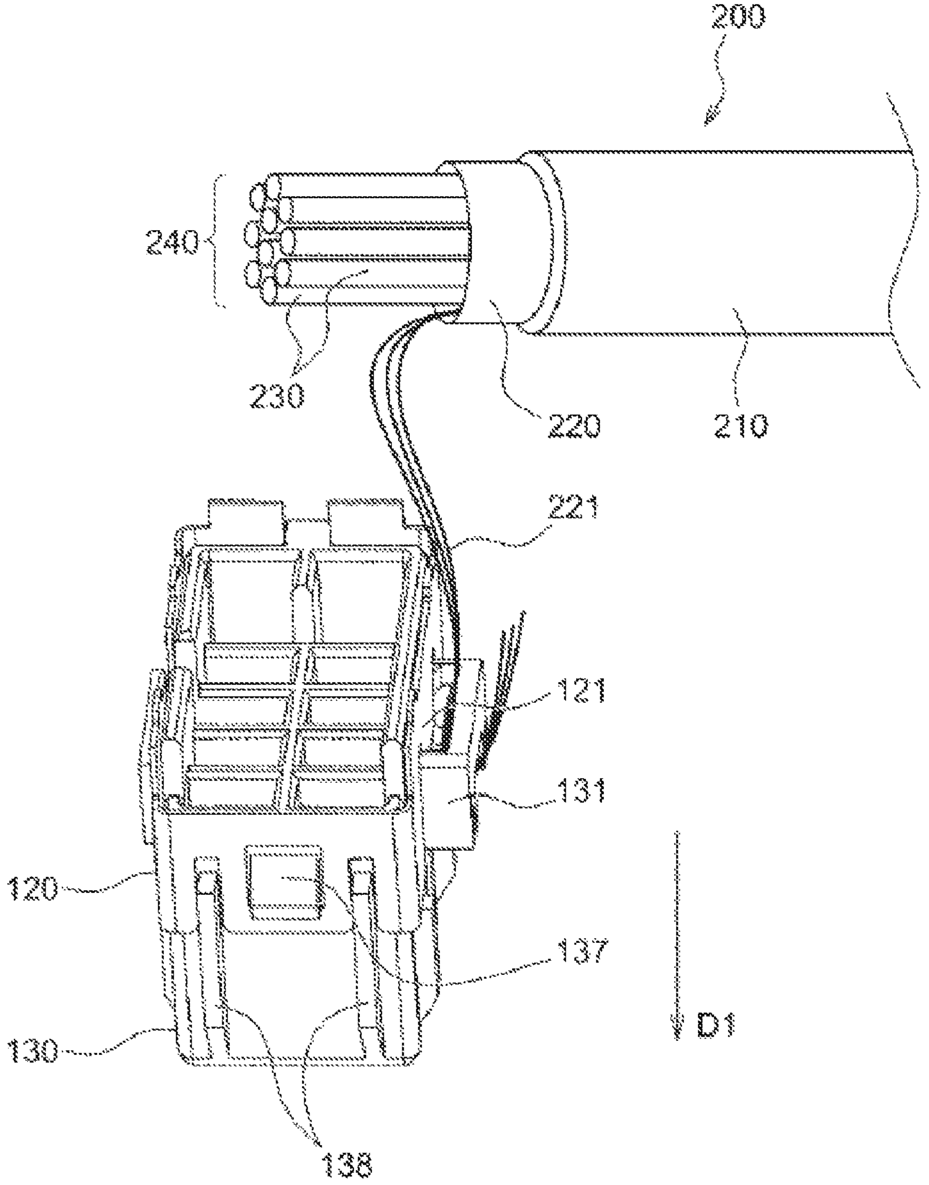
FIG. 15D is a schematic view for explaining a connection between the cable shields and the shell in the electric connector unit according to one embodiment of the present disclosure.

Then, the shell 120 is assembled with the terminal housing 130. As illustrated in FIG. 15C, the shell 120 may be assembled along a side of the terminal housing 130 from the same direction as the direction of inserting the cable shields (for example, the conductive elements 221). The shield fixation portion 121 is inserted into the opening 131 by assembling the shell 120 with the terminal housing 130 (see FIGS. 14 and 15D). The shield fixation portion 121 may be inserted so that the cable shields are sandwiched between the shield fixation portion 121 and the inner wall surface of the opening 131. In one embodiment of the present disclosure, the shield fixation portion 121 is inserted and elastically deformed while interfering with the cable shields collected on the inner wall surface having the notched portion 132 in the opening 131, whereby the shield fixation portion 121 may be brought into intimate contact with the cable shields in the opening 131. In the procedure described above, the cable shields 220 and the shell 120 are electrically connected to each other.

As illustrated in FIG. 14, the tongue 122 of the shell 120 may be inserted into the interior of at least one of the plurality of terminal housing portions 136 of the terminal housing 130 when the terminal housing 130 is attached to the shell 120. The earth terminal 140*a* and the tongue 122 are electrically connected by placing the earth terminal 140*a* in the terminal housing portion 136 into which the tongue 122 is inserted. In other words, the shell 120 assembled with the terminal housing 130 is electrically connected to the earth terminal 140*a* through the tongue 122 in the procedure described above. Such an earth terminal 140*a* is electrically connected to the ground terminal of the device connector in a state in which the connector and the device connector mates with each other. In other words, the shell 120 and the earth terminal of the device connector are electrically connected to each other through the tongue and the earth terminal 140*a* by the operation of allowing the connector and the device connector to mate with each other.

The above-described configuration allows the cable shields 220 of the present disclosure to be electrically connected to the ground terminal of the device connector through the shell 120 in a state in which the connector and device connector of the present disclosure match with each other. In other words, the cable shields 220, the shell 120, and the earth terminal of the device connector are electrically connected to each other in the state in which the connector and the device connector mate with each other. This means that the shield elements included in the cables, connector, and device connector of the present disclosure can be appropriately grounded in the mating state. Accordingly, the electric connector unit of the present disclosure can provide the configuration of the more suitable electromagnetic shield that can more appropriately electrically shield the cables and the terminals in the connector from each other by above-described structure.

Figure 8:
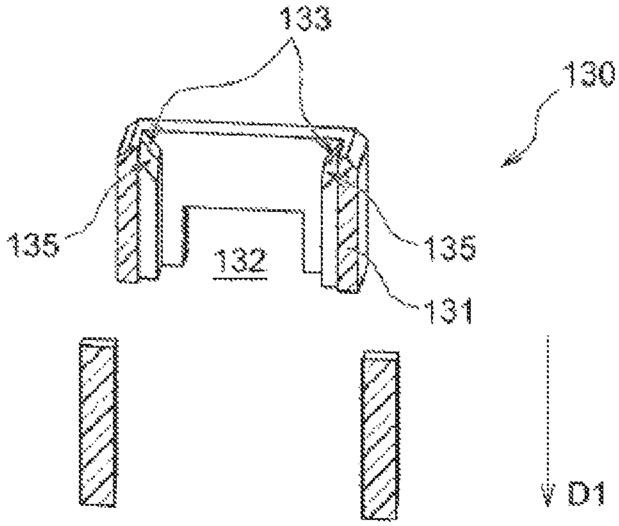
FIG. 8 is a schematic cross-sectional view of a cross section taken along the line B-B of the terminal housing in FIG. 7 and viewed in the arrow direction.

In one embodiment of the present disclosure, the opening 131 of the terminal housing 130 may include at least one tapered face 133 on the inner wall surface. FIG. 8 is a schematic cross-sectional view of a cross section, taken along the line B-B of the terminal housing 130 illustrated in FIG. 7, as viewed in the arrow direction. As illustrated, at least a part of the inner wall surface of the opening 131 may be the tapered face 133. The tapered face refers to at least a part of the inner wall surface of the opening 131, which gradually slopes toward the interior of the opening 131. In other words, at least a part of the inner wall surface of the opening 131 may slope to form an angle with respect to the direction of inserting the shield fixation portion and the cable shields. When such an insertion direction is generally parallel to the direction D1 of mating with the device connector of the terminal housing 130, the tapered face of the opening can be understood to slope to form an angle with respect to the mating direction D1.

Figure 9:
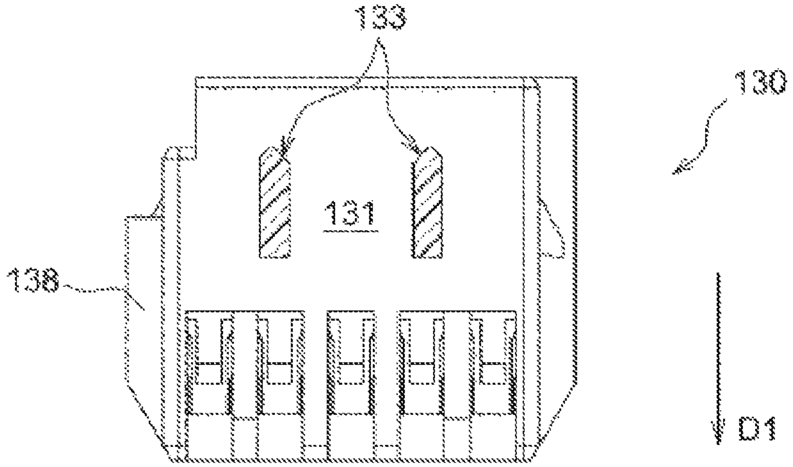
FIG. 9 is a schematic cross-sectional view of a cross section taken along the line C-C of the terminal housing in FIG. 7 and viewed in the arrow direction.

FIG. 9 is a schematic cross-sectional view taken along the line C-C of the terminal housing 130 illustrated in FIG. 7, as viewed in the arrow direction. As illustrated, the tapered face 133 of the opening 131 may gradually slope toward the interior of the opening 131. In other words, at least a part of the inner wall surface of the opening 131 may slope so that at least a part of the internal space of the opening 131 gradually narrows. More specifically, the tapered face 133 may be formed on an inner wall surface at an end of the opening 131 into which the cable shields and/or the shield fixation portion are inserted. In other words, the cable shields and/or the shield fixation portion may be inserted into the opening 131 from the end including the tapered face 133. Such a tapered face 133 enables the cable shields inserted into the opening 131 to be guided toward the interior of the opening along the slope of the tapered face 133. The opening 131 includes the tapered face 133 described above, whereby in the opening 131, the cable shields can be collected in the center of the opening 131. In particular, when the cable shields inserted into the opening 131 are the plurality of conductive elements 221 (see FIG. 14), the plurality of conductive elements 221 are collected in the center by the tapered face 133, whereby the subsequent insertion of the shield fixation portion can be more easily performed. Further, the inserted shield fixation portion and the cable shields can be more reliably electrically connected to each other, and the configuration of the more suitable electromagnetic shield can be achieved.

A slope angle between the tapered face and the mating direction D1, as viewed in a cross section illustrated in FIG. 9, is not particularly limited as long as the effects described above are obtained when the cable shields are inserted. For example, the slope angle may be 5° or more and 85° or less, and may be, for example, 10° or more and 70° or less, or 20° or more and 70° or less.

Figure 10:
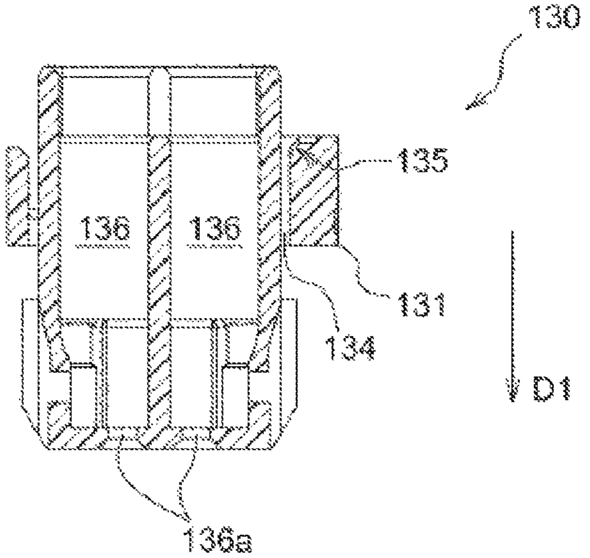
FIG. 10 is a schematic cross-sectional view of a cross section taken along the line D-D of the terminal housing in FIG. 7 and viewed in the arrow direction.

FIG. 10 is a schematic cross-sectional view taken along the line D-D of the terminal housing 130 illustrated in FIG. 7, as viewed in the arrow direction. As illustrated in FIGS. 7 and 10, the terminal housing 130 may include slide grooves 134 in the interior of the opening 131. More specifically, the opening 131 may include the slide grooves 134 extending along sides of the terminal housing 130. The slide grooves 134 may be formed on the side wall of the opening 131 coming into contact with the sides of the terminal housing 130. In other words, at least one slide groove 134 may be formed between the side wall of the opening 131 and the outer side of the terminal housing 130. In other words, the side wall of the opening 131 may include at least one concave slide groove 134 in a portion coming into contact with the outer side of the terminal housing 130. For example, the slide grooves 134 may be disposed on inner corners of the opening 131, coming into contact with on sides of the terminal housing 130, as illustrated in FIG. 7. In other words, the slide grooves may be defined by the sides of the terminal housing 130 and the concave portions disposed on the inner corners of the opening. Such a slide groove 134 can help the shield fixation portion to be guided into the interior of the opening 131 when the shell and the terminal housing are assembled with each other. In other words, the shield fixation portion may be inserted into the interior of the opening 131 along such a slide groove 134. The formation of the slide groove 134 in the opening 131 can more preferably suppress the backlash of the shield fixation portion in the opening 131, and can more preferably prevent poor contact with the cable shields from occurring. In other words, the slide groove 134 can provide a more reliable and stable electric connection between the shield fixation portion and the cable shields to achieve the configuration of the more suitable electromagnetic shield.

As illustrated in FIG. 10, the opening 131 includes a guide face 135 on the inner wall surface. Herein, the guide face 135 refers to a face having a tapered shape formed in an end of the slide groove 134. In one embodiment, the guide face 135 is formed on the inner wall surface of the opening 131 including the slide groove 134, and such a guide face 135 may gradually slope toward the slide groove 134. The guide face 135 may gradually slope toward the interior of the terminal housing 130 to form an angle with respect to a side of the terminal housing 130. In other words, the guide face 135 may slope to gradually fall toward the direction of inserting the shield fixation portion (that is, the mating direction D1). This means that the slide groove 134 can includes a structure in which the slide groove 134 gradually narrows toward the mating direction D1 in any one end. The shield fixation portion is inserted from the end including such a guide face 135 into the opening 131. In other words, the guide face 135 may be formed in a side closer to the insertion opening of the shield fixation portion on the slide groove 134. The guide face 135 sloping toward the slide groove 134 guides the shield fixation portion to the slide groove 134, and can contribute to suppression of physical interference in the insertion of the shield fixation portion. Accordingly, such a structure further facilitates an operation of assembling the shield elements to enable provision of the configuration of the more suitable electromagnetic shield.

A slope angle formed by the guide face 135 with respect to a side of the terminal housing 130 as viewed in a cross section illustrated in FIG. 10 is not particularly limited as long as the above-described effects are obtained when the shield fixation portion 121 is inserted. For example, the slope angle may be 5° or more and 85° or less, and may be, for example, 10° or more and 70° or less, or 20° or more and 70° or less.

In one embodiment of the present disclosure, the device connector 300 (see FIG. 3) may be a motor side connector that is disposed on a motor device. For example, the electric connector unit of the present disclosure may be applied to a motor device such as an industrial machine or an industrial robot. In one embodiment of the present disclosure, the electric connector unit that is applied in such a motor device may be a composite electric connector unit for a power source and a signal, including an inner cable for supplying a power supply voltage that allows the device to be driven or braked and an inner cable for delivering a signal from an apparatus such as a sensor mounted on the device.

In the composite electric connector unit for such a power source and a signal, a terminal for delivering a signal and a terminal for supplying a power supply voltage can be positioned to be next to each other, and mutual interference between the terminals can exist in actuation of the device. Therefore, the terminal for delivering a signal and the terminal for supplying a power source may be housed in different terminal housings, respectively, and the configuration of the electromagnetic shield of the present disclosure may be applied to at least one terminal housing. The mutual interference can be reduced or removed by, for example, forming an opening in the terminal housing that houses the terminal related to the delivery of a signal and applying the configuration of the electromagnetic shield of the present disclosure. In the electric connector unit according to one embodiment of the present disclosure, each of an inner cable bundle for a power source and an inner cable bundle for a signal may be included in the cable 200 including the cable shields 220 and the covering element 210, and the inner cable bundle for a power source and the inner cable bundle for a signal may be separately inserted from the two insertion openings 111 formed in the case housing 110 (see FIGS. 1 and 3). In a further embodiment, a composite cable in which a cable for a power source and a cable for a signal are bundled may be configured to insert such a composite cable into a case housing.

The embodiments of the present invention are described above. However, the present invention is not limited thereto. Various modifications, such as combinations of the configurations described above, based on the knowledge of those skilled in the art are possible are possible without departing from the gist of claims.

For example, the direction of inserting a shield fixation portion and/or cable shields into an opening may be opposite to the direction illustrated in the drawings. In other words, a shield fixation portion 121 and cable shields 220 (for example, conductive elements 221) may be inserted from below an opening 131 toward the upward direction although the shield fixation portion 121 and the cable shields 220 (for example, the conductive elements 221) are inserted from above the opening 131 toward the downward direction in the drawings (for example, FIG. 14).

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An electric connector unit, comprising:

a connector, including:

a terminal housing having an opening on an exterior side thereof; and a shell attached to the terminal housing and defining a shield fixation portion inserted into the opening, the shield fixation portion including an elastic tab arranged on the exterior side of the terminal housing, the elastic tab of the shield fixation portion arranged within the opening and defining a free end opposing an interior wall of the terminal housing, the shield fixation portion extending down the exterior side of the terminal housing and into the opening, and the elastic tab extending from a remainder of the shield fixation portion in a direction toward a top of the terminal housing; and a cable connected to the connector, including:

an inner cable bundle having a plurality of inner cables; and a cable shield surrounding the inner cable bundle, at least a portion of the cable shield inserted into the opening and electrically connected to the shield fixation portion within the opening.

2. The electric connector unit according to claim 1, wherein the cable shield includes a conductive element, the conductive element being held between the opening and the shield fixation portion.

3. The electric connector unit according to claim 2, wherein the conductive element is folded back after passing through the opening and extends along an exterior surface of the terminal housing which defines the opening.

4. The electrical connector unit according to claim 3, wherein the opening comprises a notched portion, the conductive element folded back at and through the notched portion.

5. The electrical connector unit according to claim 2, wherein the conductive element includes a plurality of conductive elements each fixed within the opening by the shield fixation portion.

6. The electric connector unit according to claim 1, wherein an outer side of the terminal housing comprises the opening, and the shield fixation portion is inserted into the opening along the outer side.

7. The electric connector unit according to claim 1, wherein the shield fixation portion is a plate spring, and the cable shield is fixed within the opening by an elastic force of the plate spring.

8. The electric connector unit according to claim 1, wherein the shell further comprises a conductive tongue electrically connected to a ground terminal housed in the terminal housing.

9. The electric connector unit according to claim 1, wherein the opening comprises at least one tapered face on an inner wall surface.

10. The electric connector unit according to claim 9, wherein the tapered face gradually slopes toward an interior of the opening.

11. The electric connector unit according to claim 1, wherein the opening comprises at least one slide groove extending along a side of the terminal housing in an interior of the opening.

12. The electric connector unit according to claim 11, wherein the opening comprises a guide face on an inner wall surface, and the guide face gradually slopes toward any one end of the slide groove.

13. A connector, comprising:

a terminal housing defining an opening;

a conductive shell attached to the terminal housing and having a shield fixation element, the shield fixation element including an elastic tab arranged on an exterior side of the terminal housing and adapted to electrically connect with a cable shield of a cable to be fixed to the connector; and a cable including:

an inner cable; and a cable shield surrounding the inner cable, at least a portion of the cable shield inserted into the opening and electrically connected to the elastic tab of the shield fixation element, the cable shield includes a plurality of conductive elements electrically connected to and held between the elastic tab and an interior wall of the opening.

14. The connector according to claim 13, wherein the elastic tab of the shield fixation element arranged within the opening and defining a free end opposing the interior wall of the terminal housing.

15. The connector according to claim 14, wherein the conductive shell is fixed to a top of the terminal housing, the shield fixation element extending down the exterior side of the terminal housing and into the opening.

16. The connector according to claim 15, wherein the elastic tab extends from a remainder of the shield fixation element in a direction toward the top of the terminal housing.

17. The connector according to claim 13, wherein the shell further defines a conductive tongue electrically connected to a ground terminal arranged in the terminal housing.

18. An electric connector unit, comprising:

a connector, including:

a terminal housing defining:

a plurality of terminal openings adapted to receive a plurality of conductive terminals; and a shield fixation opening on the terminal housing and outside of the plurality of terminal openings; and a shell attached to the terminal housing and defining a shield fixation element inserted into the shield fixation opening, the shield fixation element including an elastic tab arranged within the shield fixation opening and having a free end opposing a wall of the terminal housing, the shield fixation element extending into the shield fixation opening in a first direction, and the elastic tab extending from a remainder of the shield fixation element in a second direction, distinct from the first direction.

19. The electrical connector unit according to claim 18, further comprising:

a cable connected to the connector, including:

an inner cable bundle having a plurality of inner cables; and a cable shield surrounding the inner cable bundle, at least a portion of the cable shield inserted into the shield fixation opening and electrically connected to the shield fixation element within the opening, the cable shield includes a plurality of conductive elements electrically connected to and held between the elastic tab and an interior wall of the opening.

20. The electrical connector unit according to claim 18, wherein the shield fixation element extends downwardly along an exterior of the terminal housing in the first direction, and the elastic tab extends upwardly in the second direction toward a top of the terminal housing.

* * * * *